Dec. 22, 1953   D. WHEELER   2,663,423
TESTING SCREEN
Filed Dec. 14, 1951   4 Sheets-Sheet 1
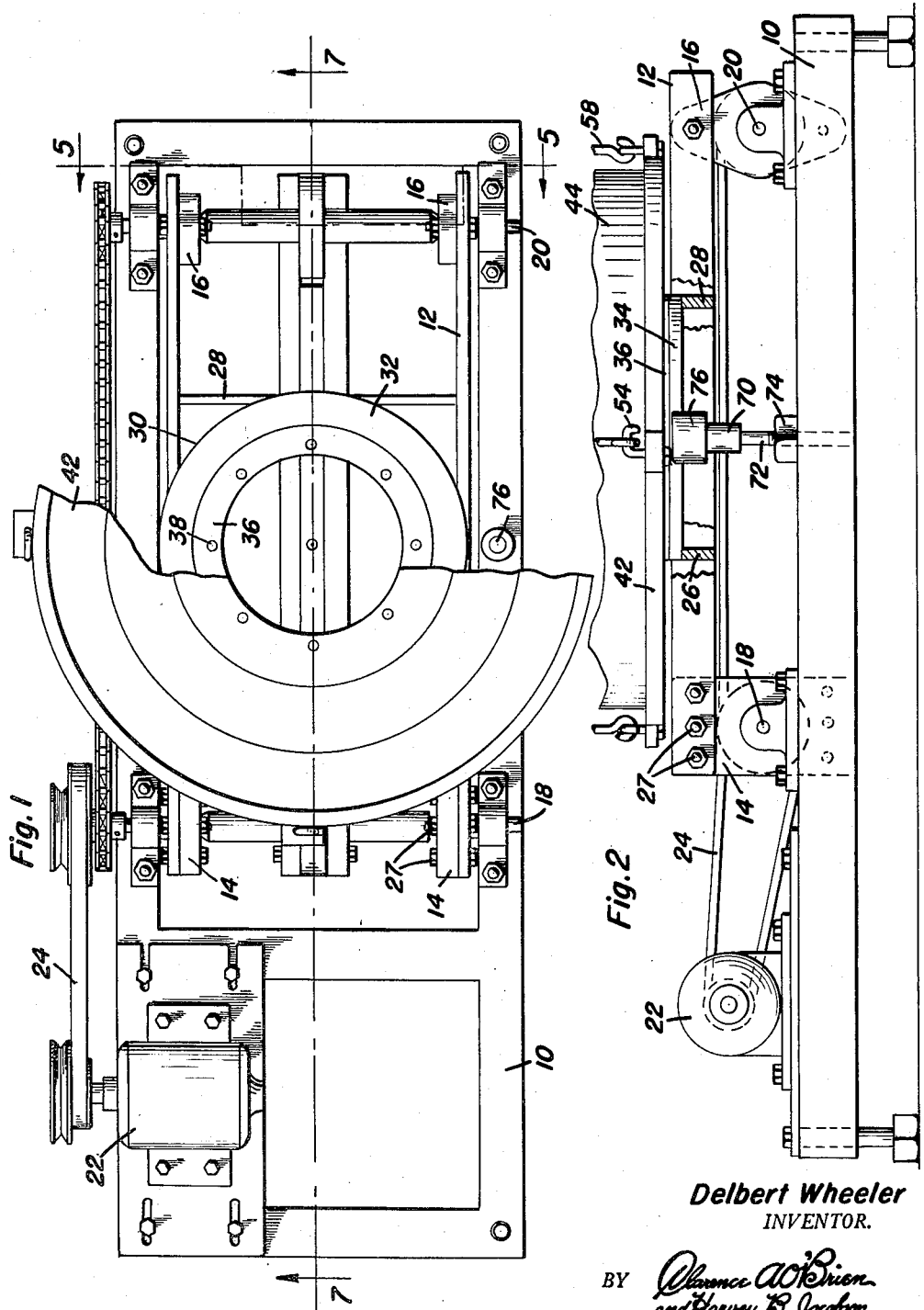
Delbert Wheeler
INVENTOR.

Dec. 22, 1953

D. WHEELER 2,663,423

TESTING SCREEN

Filed Dec. 14, 1951

Delbert Wheeler
INVENTOR.

BY *Clarence A. O'Brien*
*and Harvey B. Jacobson*
Attorneys

Dec. 22, 1953  D. WHEELER  2,663,423
TESTING SCREEN
Filed Dec. 14, 1951  4 Sheets-Sheet 3
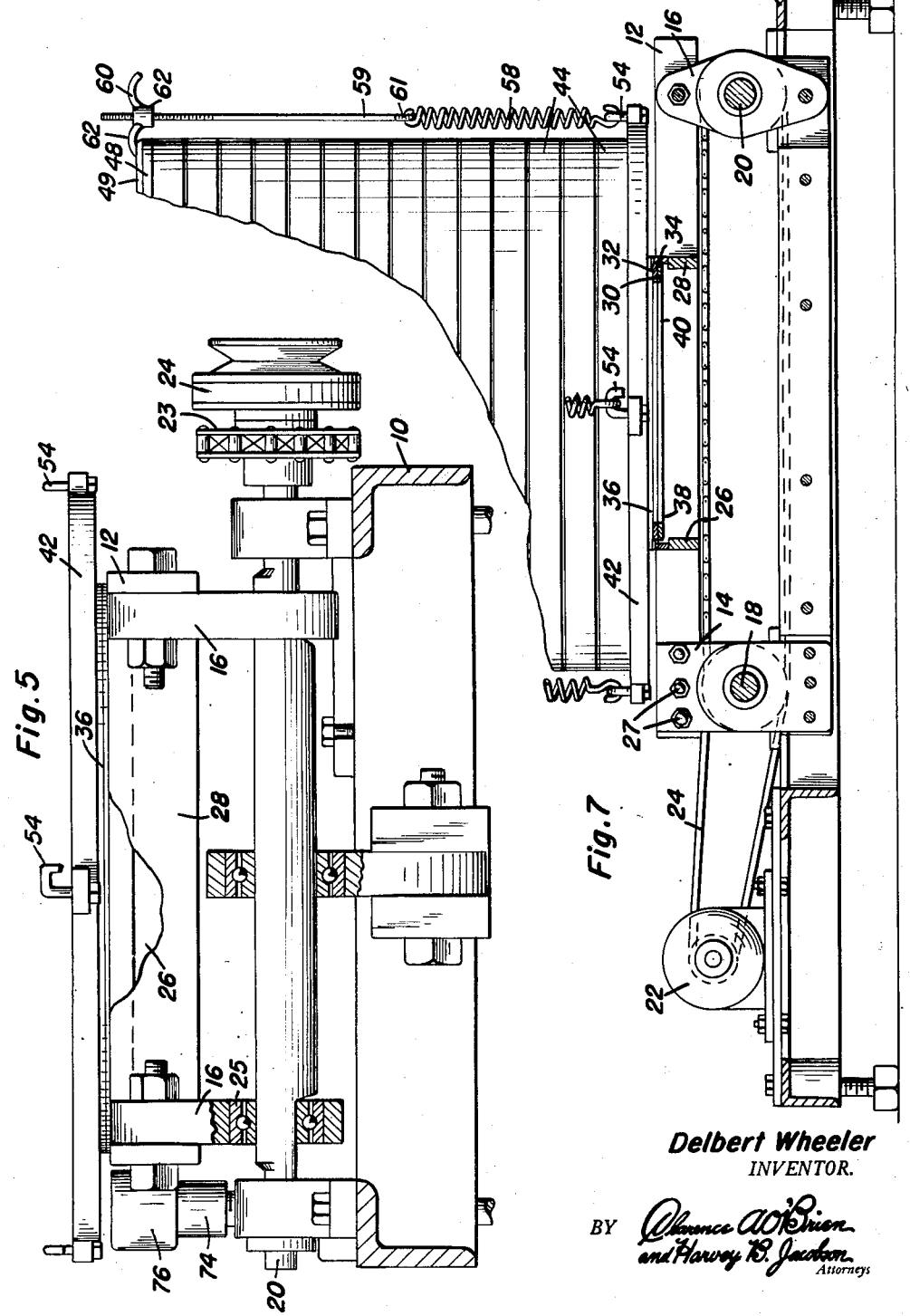
Delbert Wheeler
INVENTOR.

Dec. 22, 1953          D. WHEELER                 2,663,423
                      TESTING SCREEN
Filed Dec. 14, 1951                          4 Sheets-Sheet 4
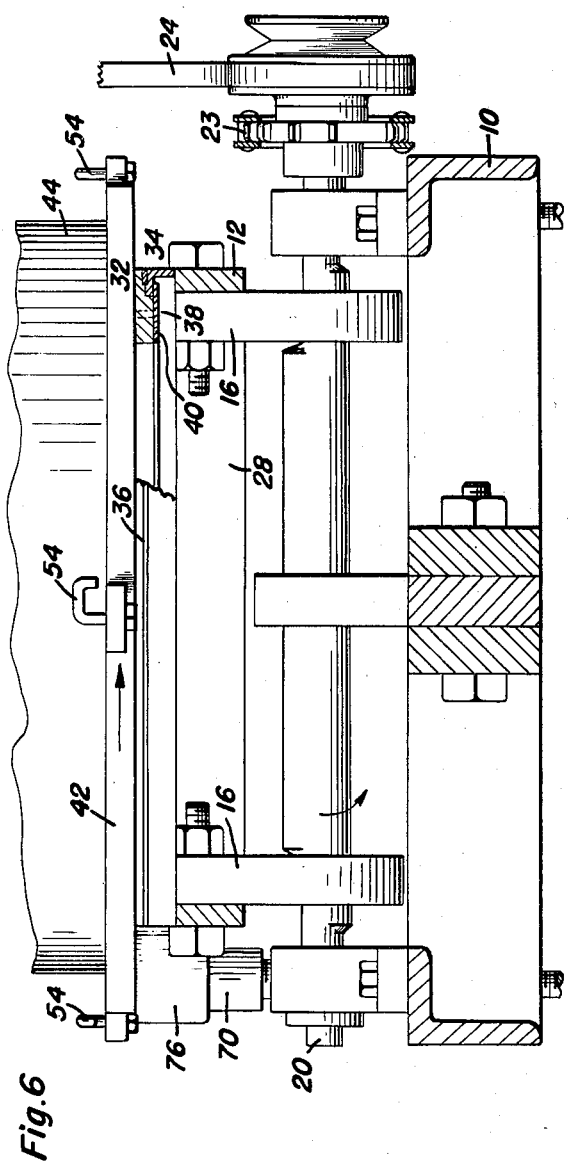
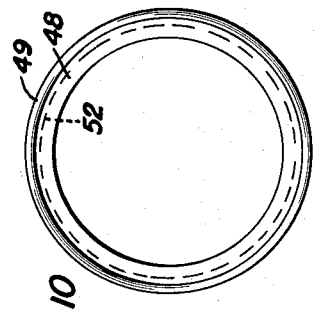
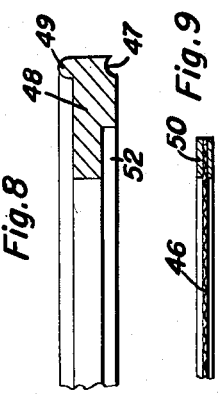
Delbert Wheeler
INVENTOR.

Patented Dec. 22, 1953

2,663,423

UNITED STATES PATENT OFFICE 2,663,423

TESTING SCREEN

Delbert Wheeler, Topeka, Kans.

Application December 14, 1951, Serial No. 261,733

10 Claims. (Cl. 209—237)

This invention comprises novel and useful improvements in a testing screen and more specifically pertains to a testing device which is in some respects similar to and constitutes an improvement over the construction set forth in my prior co-pending application, Serial No. 209,086, filed February 2, 1951, for Testing Device.

The primary object of this invention is to improve the testing of granular materials by agitating, separating and classifying the components of the material in accordance with predetermined gradients of size.

A more specific object of the invention is to improve the construction and performance of the type of apparatus for testing granular materials as set forth in my above identified co-pending application.

A still further object of the invention is to provide an improved testing device to conform with the preceding objects in which an assembly of conventional sifting screens or sieves is mounted upon a carriage to which a vibratory motion is imparted; and wherein an additional rotary movement is imparted to the screens to facilitate their sifting action.

A still further object of the invention is to provide an apparatus as set forth in the preceding object in which a step by step rotary motion is imparted to the sifting screen assembly.

A still further object of the invention is to provide an apparatus in accordance with the preceding objects in which a step by step rotary motion is imparted to the screen assembly at a predetermined time during the vertical circular motion of the carriage carrying the screen assembly; and in response to such vibratory motion.

A still further specific object of the invention is to provide an improved manner and means whereby a plurality of conventional sifting screens may be mounted in a fixed stacked assembly upon a turntable journaled on a vibratory carriage.

And a final important object of the invention to be specifically enumerated herein, resides in the provision of an improved means for rotatably mounting a turntable in accordance with the preceding objects upon the vibratory carriage of a testing device.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a top plan view, part being broken away, showing a testing device in accordance with the principles of this invention;

Figure 2 is a side elevational view of the apparatus of Figure 1, parts being broken away and shown in vertical sectional view;

Figure 5 is a vertical transverse sectional detail view taken substantially upon the plane indicated by the section line 5—5 of Figure 1 and upon an enlarged scale;

Figure 6 is a view somewhat similar to Figure 5 but showing the parts in a different position during operation of the device;

Figure 7 is a vertical central longitudinal sectional view taken substantially on the plane indicated by the section line 7—7 of Figure 1, parts being broken away;

Figure 8 is a fragmentary sectional detail view showing a portion of the top or cover plate for retaining the sifting screens in a stacked relationship;

Figure 9 is a fragmentary vertical sectional detail view of a portion of one of the sifting screens of this invention;

Figure 10 is a top plan view of the top plate or retaining ring as shown in Figure 8.

Figure 3:
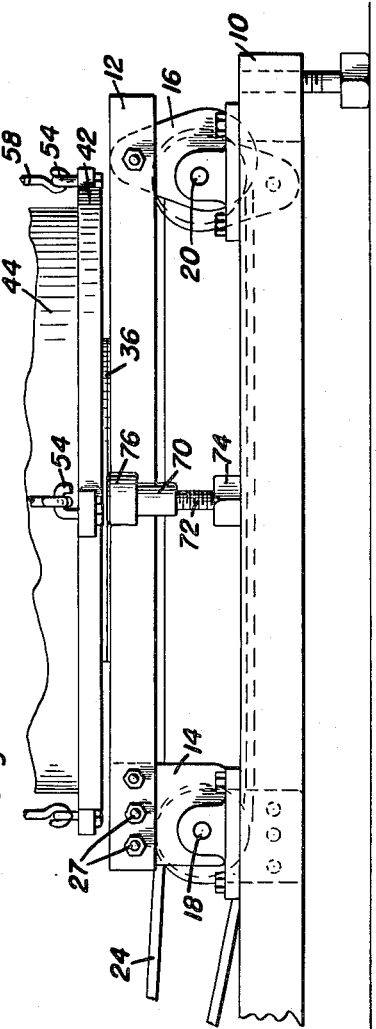
Figure 3 is a fragmentary side elevational view of the rear portion of Figure 2, the parts being shown in a different position during the vibratory movement of the testing device.

Reference is now made more specifically to the accompanying drawings, wherein like numerals designate similar parts throughout the various views, and wherein the numeral 10 designates generally a support or base of any suitable type and which as illustrated may conveniently be of a character and construction set forth in detail in my above identified copending application. A vibratory carriage 12 which is preferably of an open frame-work construction, is in turn supported upon and above the base 10 as by means of depending brackets 14 and 16 at the opposite ends thereof, which brackets are respectively journaled upon eccentric vibrating shafts 18 and 20 respectively. Suitable counter-balancing means for the eccentric shafts are illustrated, but inasmuch as the arrangement and construction of these eccentric shafts and their counterbalances have been fully disclosed and are claimed in my above identified co-pending application, further explanation is believed to be unnecessary.

Since the subject matter set forth in this application and claimed hereinafter does not depend upon and is not limited to any particular construction for mounting and causing vibratory motion of the carriage 12, a further explanation of the same is believed to be unnecessary. However, any suitable actuating means such as an electric motor or the like 22 may be connected as by a belt drive 24 with one of the shafts 18, while this shaft is in turn connected with the shaft 20 as by a sprocket chain 23, timing belt or the like whereby the two shafts are synchronized and timed with respect to each other and are driven from the power source 22, the overall arrangement being such that circular motion in a vertical plane is imparted to the carriage 12. The carriage 12 at the end mounted upon the shaft 20, is mounted by means of a pivotal connection including an anti-friction bearing assembly 25, see Figure 5, while the end of the carriage journaled on the shaft 18 is mounted with a fixed connection by the bolts 27. As a consequence, the entire carriage is give a rapid vertical circular motion relative to the base 10, and is always in a horizontal position parallel to the base 10 during its entire cycle.

By the term vertical circular motion it is intended to designate the uniform circular path of travel of the carriage 12 in a vertical plane and with respect to the eccentricity of the shafts 18 and 20.

The open frame-work of the carriage 12 includes a pair of longitudinally spaced transverse bars 26 and 28, upon the upper surface of which is mounted and fixedly secured a turntable mount in the form of a ring 30. This ring may conveniently consist of an angle iron member, which as shown in Figures 6 and 7, has a horizontal annular flange 32 and a vertically extending annular web 34.

Resting upon the horizontal flange 32 and rotatable thereon is a member 36, having secured thereto by bolts 38 a ring 40 which underlies the horizontal web 32, the latter constituting a retaining rib or abutment surface. Thus, the member 36 is retained upon the rotatable member 30 in a removable manner for rotation therewith. Secured to the member 36 and resting thereon is a bottom plate 42 to which is secured a nested stack of sifting screens.

This stack consists of graduated conventional sifting screen frames 44, which rest upon the bottom plate 42, and which have a top plate 48 overlying the stack of screens for clamping the same rigidly to the bottom plate. An improved and novel fastening construction is provided for removably securing any desired number of shifting screens between the top plate and the bottom plate.

Figure 11:
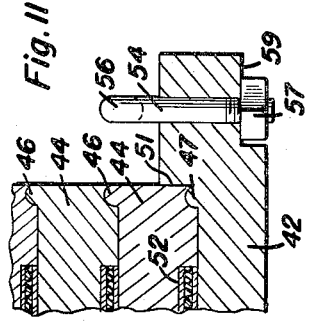
Figure 11 is a vertical sectional detail view through a portion of the bottom plate of the sieve retaining means.

The construction of the top plate is shown in detail in Figures 8 and 10, the construction of the bottom plate is shown in detail in Figure 11, while the latter figure also shows the construction of the conventional screens and the manner in which the same are associated with each other and with the bottom plate, the screen itself being shown in detail in Figure 9.

Each screen 44 comprises an annular member having upon one surface which may be termed the bottom surface thereof an annular recess 52, this recess being also pressed in the top plate 48. Upon the surface contained in the recess 52, which may be termed the bottom surface of the screen or plate, the screen frame 44 is provided adjacent its periphery with an annular groove 47. Upon the upper or top face of each of the screen frames 44, and about the periphery thereof, is an upstanding annular bead or rim 46 which is adapted to be nested and seat within the groove 47 of the immediately superposed screen frame or top plate.

The screen itself consists of a disk or foraminous sheet 46 of suitable material and a predetermined mesh corresponding to the size of particles adapted to be sifted through the screen, the rim of which disk is secured between a pair of rings 50. These rings in turn fit within the annular recess 52 as clearly shown in Figure 11.

Figure 4:
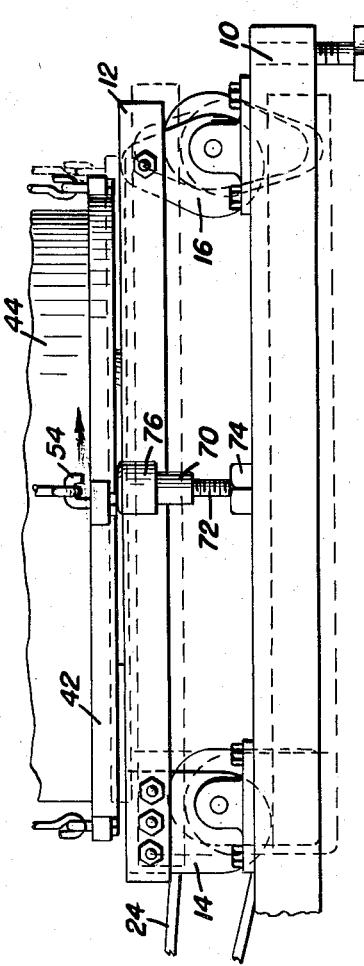
Figure 4 is a view similar to Figure 3 but showing a still further position of the parts during the operation of the device.

The top surface of the bottom plate 42 is provided with a central depression, chamber or recess 51 in which is seated the lowermost of the screen frames 44 as shown in Figure 4. Extending upwardly from the periphery and top surface of the top plate 48 is an annular bead or rim 49 which constitutes part of a locking means for retaining the stack of screens in their nested assembled position as set forth hereinafter.

Secured to the rim portion of the bottom plate 42 are a plurality of hooks or bolts 54, each having an eye portion or hooked portion 56 and having its screw threaded lower extremity received in a nut 57 non-rotatably seated in a recess or notch 59 in the bottom portion of the bottom plate 42. Tension springs 58 are terminally secured to tension rods or tie rods 59 as by means of a hook 61 in their lower ends, and to the above-mentioned hook members 54. The upper ends of these tension or tie rods 59 having securing wing nuts 60 which are thus adjustably carried by the rod 59, and which have one end 62 adapted to overlie and rest upon the rim 49 of the top plate 48, whereby the plurality of springs and tie rods serve to resiliently clamp the top plate upon the stack of screen frames for holding the entire assembly in yieldingly retained engagement upon the bottom plate 42 for rotation and agitation therewith as set forth hereinafter.

The functioning of the screens, their construction and arrangement are all of common knowledge and further explanation of the same is believed to be unnecessary.

It will however be now apparent that as the turntable assembly consisting of the bottom plate 42, the member 36 and the member 40 are rotated upon the annular supporting ring 30, that the contents of the screens will be shifted as set forth hereinafter.

It will be noted that the under surface of the bottom plate 42, adjacent its periphery, overlies the sides of the vibratory carriage 12 and of the supporting base 10. It will also be apparent that the bottom plate together with the stacked screens assembled thereon and the vibratory carriage is given a vertical circular motion relative to the base 10.

In accordance with this invention, use is made of this vertical circular motion of the carriage to impart a step-by-step rotation to the turntable and the stacked screen assembly carried thereby. For that purpose, one side of the supporting base 10 is provided with a standard 70 having a screw threaded extremity 72 encased in a screw threaded bore in the base 10 and adjustably secured thereto as by a locking nut 74. Upon its upper end, the standard 70 is provided with a head 76 of cushioning material such as rubber, cork, or the like and having an abutment surface upon its upper portion adapted to underlie and intermittently engage the under surface of the bottom plate 42. The arrangement is such, as viewed in Figures 2-6, that as the carriage moves in one direction during its vertical circular motion, it will be lowered so that the undersurface of the bottom plate 42 will rest upon the abutment surface of the member 76 and thus cause a rotary movement of the turntable as the carriage completes the lower portion of the substantially horizontal component of its vertical circular travel. Upon the upper portion of the motion of the carriage however the same will be lifted up until the bottom plate is disengaged from the abutment surface so that reverse rotation to the turntable is avoided. Thus, a step by step rotary movement of the turntable is effected during the vibration of the same so that the vibratory motion of the vertical circular movement of the turntable will cause movement of the granular material upon the screens in a different direction relative to the surface of the screen, and will also throw the material away from the usual fractional sized openings around the periphery of each sieve.

It is of course apparent that during this step by step rotation of the screen system, that the counter-balanced vibration of the same in accordance with my above identified co-pending application will be attained.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A testing device comprising a base, a vibratory carriage, support means mounting said carriage upon said base, actuating means for imparting a vertical circular vibratory motion to said carriage, a turntable journaled on said carriage for movement about a vertical axis, screens supported by said turntable, means responsive to vibratory movement of said carriage for imparting rotary movement to said turntable.

2. A testing device comprising a base, a vibratory carriage, support means mounting said carriage upon said base, actuating means for imparting a vertical circular vibratory motion to said carriage, a turntable journaled on said carriage for movement about a vertical axis, screens supported by said turntable, means carried by said base for imparting rotary movement to said turntable at a predetermined time during the vibratory movement of said carriage.

3. The combination of claim 1 wherein said last means engages the turntable at the periphery of the same.

4. The combination of claim 1 wherein said last means includes a standard mounted on said base, an abutment surface on said standard positioned for engaging said turntable adjacent the periphery thereon.

5. The combination of claim 1 wherein said last means includes a standard mounted on said base, an abutment surface on said standard positioned for engaging said turntable adjacent the periphery thereof, said turntable being engageable with said abutment surface once during each cyclic movement.

6. A testing device comprising a carriage, means for imparting a generally vertical circular movement to said carriage, a turntable journaled upon said carriage, means for securing a plurality of sifting screens on said turntable, means for imparting a step by step rotation to said turntable.

7. The combination of claim 6 wherein said last means causes rotation of said turntable at a predetermined time during the vertical circular motion of said carriage.

8. A testing device comprising a base, a vibrating carriage, support means mounting said carriage upon said base, actuating means for imparting a vertical circular vibratory motion to said carriage, said motion being planar, a turntable journaled on said carriage for movement about an axis substantially parallel to said motion plane, means responsive to said planar circular motion for imparting rotary movement to said turntable.

9. The combination of claim 8 wherein said means is mounted on said base and disposed at a point within the planar path of movement of said turntable and engaging a portion thereof radially disposed of said axis during a predetermined cyclic period of said circular motion.

10. The combination of claim 9 wherein said means is stationary.

DELBERT WHEELER.

References Cited in the file of this patent

UNITED STATES PATENTS

| Number | Name | Date |
|---|---|---|
| 1,290,531 | Evert | Jan. 7, 1919 |
| 2,074,733 | Porter | Mar. 23, 1937 |

FOREIGN PATENTS

| Number | Country | Date |
|---|---|---|
| 98,778 | Sweden | Apr. 30, 1940 |